United States Patent [19]
Umezawa

[11] Patent Number: 5,439,087
[45] Date of Patent: Aug. 8, 1995

[54] WET-TYPE MULTI-PLATE FRICTIONAL ENGAGEMENT APPARATUS

[75] Inventor: Shigeki Umezawa, Fukuroi, Japan

[73] Assignee: NSK-Warner K.K., Tokyo, Japan

[21] Appl. No.: 165,895

[22] Filed: Dec. 14, 1993

[30] Foreign Application Priority Data

Dec. 17, 1992 [JP] Japan .................. 4-337562

[51] Int. Cl.6 ............................................ F16D 13/68
[52] U.S. Cl. .................. 192/70.2; 192/70.14; 192/107 R
[58] Field of Search ............... 192/70.12, 70.14, 70.16, 192/70.19, 70.2, 107 R; 188/71.5, 73.2

[56] References Cited

U.S. PATENT DOCUMENTS 4,267,910  5/1981  Yamamori et al. ......... 192/70.2 X
4,396,100  8/1983  Eltze .................. 192/70.12

FOREIGN PATENT DOCUMENTS 2459031   6/1976  Germany ............... 192/70.2
3326409   3/1984  Germany .............. 192/70.14
56-5613   2/1981  Japan .
61-45116  3/1986  Japan ................. 192/70.2
3-9119    1/1991  Japan ................. 192/70.2

Primary Examiner—Richard M. Lorence
Attorney, Agent, or Firm—Shapiro and Shapiro

[57] ABSTRACT

In a wet-type multi-plate frictional clutch assembly, clutch plates are prevented from being mounted inversely to a clutch hub or a clutch drum to assure proper assembly. Splines formed may be on the periphery of an inner drum or the clutch hub asymmetrically with respect to any diameter of the cross section of the inner drum or the clutch hub perpendicular to the axial direction. Teeth of the passive clutch plates or the drive clutch plates may be designed to properly orient the clutch plates by engaging with the splines.

8 Claims, 8 Drawing Sheets

WET-TYPE MULTI-PLATE FRICTIONAL ENGAGEMENT APPARATUS

BACKGROUND OF THE INVENTION

1. Field of the Invention

The present invention relates to a wet-type multi-plate frictional engagement apparatus using wet-type friction material. More specifically, the present invention relates to a wet-type multi-plate frictional engagement apparatus having a plurality of clutch plates which is preferably used in an automatic transmission for a car, and the like, and in a transmission for a motorcycle, and the like.

2. Related Background Art

Figure 1:
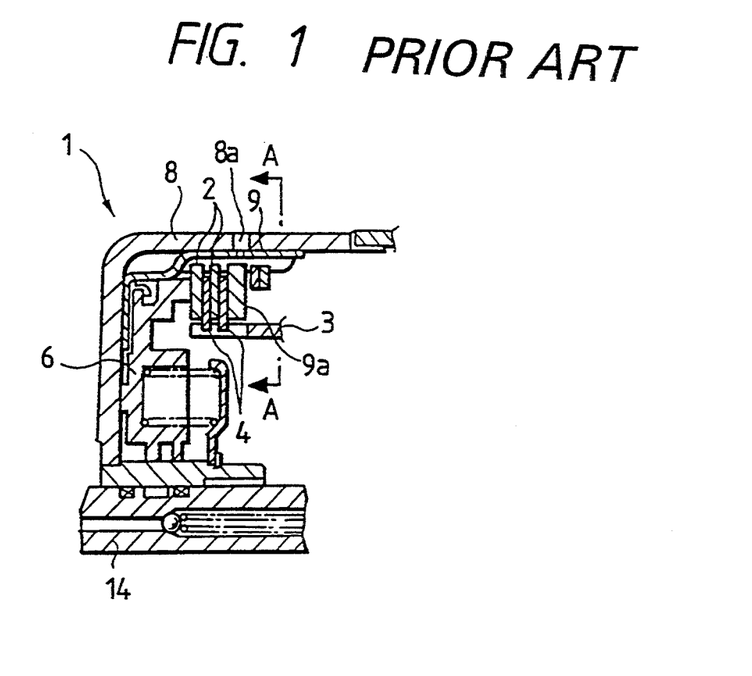
FIG. 1 shows part of a cross section of a conventional frictional engagement apparatus.

An example of the conventional frictional engagement apparatus is shown in FIG. 1. This frictional engagement apparatus consists of: a shaft barrel member 14 fixed to a transmission case (not shown); a clutch drum 1 rotatably supported by said shaft barrel member 14; and a clutch hub 3 fixed to another clutch drum (not shown). The clutch drum 1 has an outer drum 8 and an inner drum 9, which is built in the outer drum 8 and fixed to the inner peripheral surface of the outer drum 8 by spot welding, or the like. As for the apparatus shown in FIG. 1, the inner drum 9 is fixed to the outer drum 8 by spot welding. Clutch plates are steel plates on which wet-type friction material is attached. Passive clutch plates 2 are held by the inner drum 1 of the clutch drum 9, while drive clutch plates 4 are held by the outer periphery of the clutch hub 3. These clutch plates are arranged alternately so that the surfaces on which frictional material is attached face the metal surfaces. Reference numeral 8a denotes an oil supply hole.

In this construction, when a piston 6 presses the passive clutch plates 2 and the drive clutch plates 4, each plate slides frictionally while nipped between the piston 6 and a stopper member 9a fixed to the inner drum 9.

Figure 2:
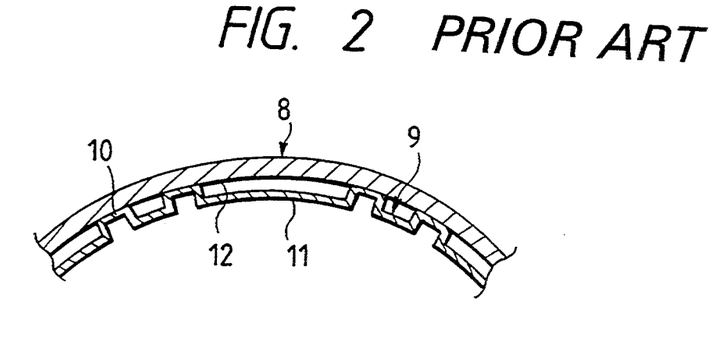
FIG. 2 shows part of the cross section of the clutch drum of the frictional engagement apparatus shown in FIG. 1, seen from the direction indicated by the arrows A in FIG. 1.

FIG. 2 shows partially broken cross sections of the outer drum 8 and the inner drum 9, which are cut along the line A—A in FIG. 1. As shown in FIG. 2, the inner drum 9 is fixed to the inner peripheral surface of the cylindrical outer drum 8. The inner drum 9 consists of cylindrical portions 11 and a plurality of spline grooves or splines 10. The splines 10 are formed at predetermined positions on the circumference of the inner drum 9 so as to project outward in radial directions. The splines 10 have a certain length in the direction of the axis of the inner drum 9 so as to carry a plurality of clutch plates. Because the front edges of the splines 10 are fixed to the inner peripheral surface 12 of the outer drum 8 by welding, or the like, the inner drum 9 is rotated integrally with the outer drum 8.

A plurality of the splines 10 formed on the circumference of the inner drum 9 are arranged symmetrically with respect to a certain diameter or symmetrically with respect to the center of the circular cross-section. These splines 10 engage with respective projecting portions of the clutch plates. The projecting portions project outward in the radial directions and have shape corresponding to the cross sections of the splines 10. Thus, the clutch plates are mounted in the inner drum 9. When the clutch plates are assembled into the clutch drum, the surfaces on which frictional material is attached are distinguished from the metal surfaces, for example, by observing them visually so that the surfaces on which frictional material is attached are faced with the metal surfaces. In order words, neither frictional surfaces nor metal surfaces are faced with each other.

As for the above-mentioned conventional friction engagement apparatus, since the surfaces on which frictional material is attached are distinguished from the metal surfaces by visually observing them, touching them, or the like when the clutch plates are put in the clutch drum, the clutch plates may be assembled inversely. Once they are assembled inversely, there is no way to check the arrangement after assembling.

In case some clutch plates of the above device are assembled inversely (backwards), frictional surfaces may face and engage each other and metal surfaces may face and engage each other. In such case, not only does capacity of driving torque decrease, but the frictional material may be burned and damaged. In the worst case, it becomes impossible for a car to move.

In order to meet concerns regarding energy and the environment, a frictional engagement apparatus is required not only to be small and lightweight, but also to have excellent durability, especially against heat. However, the above-described structure is subject to temperature differences between the frictionally engaged surfaces of the drive clutch plates and those of the passive clutch plates, because heat capacity of the clutch drum is different from that of the clutch hub. As a result, the frictional material on the passive clutch plates and the drive clutch plates may suffer from abnormal abrasion, and the durability of the frictional engagement apparatus varies, depending on working conditions.

Therefore, a first object of the present invention is to provide a wet-type multi-plate frictional engagement apparatus employing metal clutch plates having wet-type frictional material only on one side, wherein the shape, or the like, of the splines formed on either the outer periphery or the inner periphery of each metal plate is made to be asymmetrical and the shape of the splines of the clutch drum or the clutch hub is made to correspond to that of the splines of each clutch plate so that the clutch plates cannot be installed backwards and the surfaces on which wet-type frictional material is attached are always faced with the metal surfaces.

A second object of the present invention is to provide a wet-type multi-plate frictional engagement apparatus which can uniform abrasion loss of the drive clutch plates and that of the passive clutch plates and which can prevent variation in durability, and thereby improve the overall durability, by thickening the splines of the clutch plates. Thus, the heat capacity of the clutch drum or that of the clutch hub does not have to be varied, that is, materials employed or the design need not be changed.

SUMMARY OF THE INVENTION

In order to achieve the above-mentioned objects, a wet-type frictional engagement apparatus according to the present invention may comprise a plurality of drive clutch and passive clutch plates which are metal plates having wet-type frictional material attached only on one side and arranged alternately so as to be engageable with each other, and a clutch drum having substantially cylindrical outer and inner drums, wherein splines formed on the peripheral surface of the inner drum are arranged asymmetrically with respect to any diameter of the cross section of the inner drum and elongated in the direction of the axis of the inner drum. The splines engage with radially outwardly projecting teeth formed on the outer peripheries of said passive clutch plates so that the passive clutch plates cannot be installed backwards.

Another wet-type multi-plate frictional engagement apparatus according to the present invention comprises a plurality of drive clutch and passive clutch plates which are metal plates having wet-type frictional material attached only on one side and arranged alternately so as to be engageable with each other, and a clutch drum having substantially cylindrical outer and inner drums. Splines are formed on the peripheral surface of the inner drum and elongated in the direction of the axis of the inner drum. The splines engage with radially outwardly projecting teeth formed on the outer peripheries of the passive clutch plates, and the splines and teeth are provided with cooperable means for directing (orienting) the passive clutch plates so that the passive clutch plates cannot be installed backwards.

Another wet-type multi-plate frictional engagement apparatus according to the present invention comprises a plurality of drive clutch and passive clutch plates which are metal plates having wet-type frictional material attached only on one side and arranged alternately so as to be engageable with each other, and a substantially cylindrical clutch hub for supporting the drive clutch plates, wherein splines formed on the peripheral surface of the clutch hub are arranged asymmetrically with respect to any diameter of the cross section of the clutch hub and elongated in the direction of the axis of the clutch hub. The splines engage with radially inwardly projecting teeth formed on the inner peripheries of the drive clutch plates so that the drive clutch plates cannot be installed backwards.

Still another wet-type frictional engagement apparatus according to the present invention comprises a plurality of drive clutch and passive clutch plates which are metal plates having wet-type frictional material attached only on one side and arranged alternately so as to be engageable with each other, and a substantially cylindrical clutch hub for supporting the drive clutch plates. Splines are formed on the peripheral surface of the clutch hub and elongated in the direction of the axis of the clutch hub. The splines engage with radially inwardly projecting teeth formed on the inner peripheries of the drive clutch plates, and the splines and the teeth are provided with cooperable means for directing (orienting) the drive clutch plates so that the drive clutch plates cannot be installed backwards.

In the above-mentioned constructions, the clutch plates cannot be installed inversely (backwards) on the clutch drum or the clutch hub with respect to the frictional surfaces and the metal surfaces. Also, abrasion loss of the drive clutch plates and that of the passive clutch plates can be uniformed and variation in durability can be reduced.

DETAILED DESCRIPTION OF THE PREFERRED EMBODIMENTS

Now, preferred embodiments according to the present invention will be described in detail with reference to the accompanying drawings, in which the same portions are indicated by the same reference numerals.

Figure 3:
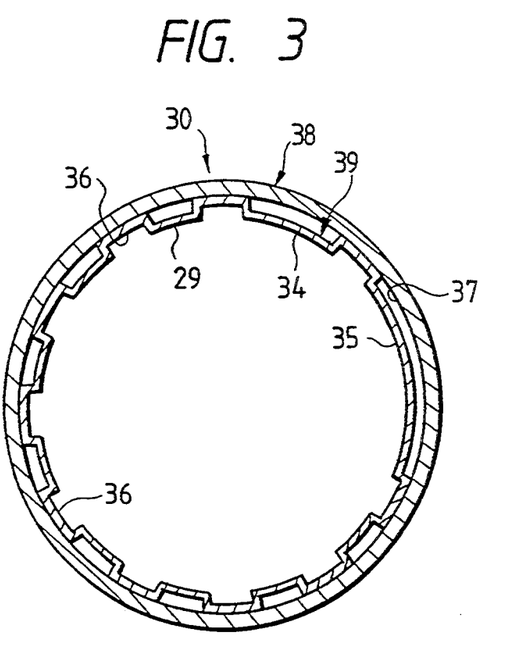
FIG. 3 is a cross-sectional view showing the structure of the clutch drum of the first embodiment according to the present invention.
Figure 4:
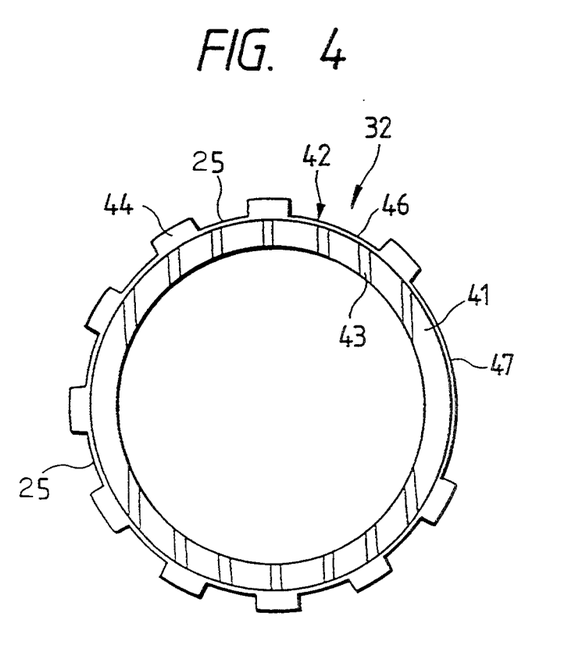
FIG.4 is a front view of the passive clutch plate of the first embodiment according to the present invention.

FIG. 3 shows the cross section, which is perpendicular to the axial direction, of a clutch drum 30 of the first embodiment according to the present invention. FIG. 4 is a front view of a passive clutch plate 32 to be put into the clutch drum 30 shown in FIG. 3. The clutch drum 30 consists of a cylindrical outer drum 38 and an inner drum 39 fixed to the inner peripheral surface 37 of the outer drum 38 by spot welding, or the like. The inner drum 39 consists of a plurality of spline portions 36 projected in the radial directions and elongated in the axial direction, a plurality of first cylindrical portions 29 joining said spline portions 36, a second cylindrical portion 34 and a third cylindrical portion 35. The spline portions 36 are of the same size, and have substantially rectangular cross sections perpendicular to the axial direction. The outer faces of the spline portions 36 are in contact with the inner peripheral surface 37 of the outer drum.

A certain number of spline portions 36 are arranged on the circumference at different intervals. In other words, the length of the arcs of the cylindrical portions joining the spline portions 36 are different. In this embodiment, the first cylindrical portions 29 have the narrowest arc, the second cylindrical portion 34 is wider, and the third cylindrical portion 35 is the widest. The second cylindrical portion 34 is adjacent to the third cylindrical portion 35 with one spline portion 36 therebetween.

FIG. 4 is the front view of the annular passive clutch plate 32 to be put in the inner drum 39 of the clutch drum 30 shown in FIG. 3. The passive clutch plate 32 consists of a metal plate 42 of steel, aluminum, or the like made by press working, and wet-type frictional material 41 attached only on one side (the front face, in FIG. 4) of the metal plate 42. In the surface on which the wet-type frictional material 41 is attached, lubricating oil grooves 43 are formed so that the lubricating oil leaking from the frictional material 41 flows into them when the clutch plates are pressed and slidingly engaged against each other.

A plurality of teeth 44 projected outward in the radial directions are formed on the outer periphery of the clutch plate 32. The number of the teeth 44 is the same as the number of the spline portions 36 of the inner drum 39. The teeth 44 have a shape corresponding to the inner surface of the spline portions 36 so as to engage with the spline portions 36 when the passive clutch plate 32 is inserted into the inner drum 39 shown in FIG. 3 from the axis direction. On the periphery of the clutch plate 32, and between the teeth 44, there are provided a plurality of first peripheral portions 25, a second peripheral portion 46 and a third peripheral portion 47. The lengths of the arcs of the first peripheral portions 25, the second peripheral portion 46 and the third peripheral portion 47 are the same as those of the first cylindrical portions 29, the second cylindrical portion 34 and the third cylindrical portion 35 of the inner drum 39, respectively.

As described above, since the spline portions 36 of the inner drum 39 and the teeth 44 of the passive clutch plate 32 are arranged asymmetrically with respect to any diameter, the passive clutch plate 32 can engage with and be inserted in the inner drum 39 only when the phases (positions) of its teeth 44 coincide with those of the spline portions 36 as shown in FIGS. 3 and 4. If the passive clutch plate 32 is inverted, the phases (positions) of the second cylindrical portion 34 and the third cylindrical portion 35 of the inner drum 39 do not coincide with those of the second peripheral portion 46 and the third peripheral portion 47 of the passive clutch plate 32. In this case, the passive clutch plate 32 cannot put into the inner drum 39. As a result, since the passive clutch plate 32 cannot be put in the inner drum 39 inversely, the surfaces of the passive clutch plates 32 on which the frictional material 41 is attached cannot be frictionally engaged with the frictional material surfaces of the drive clutch plates (not shown in the drawings of the first embodiment); nor can the metal surfaces of the passive clutch plates be engaged with those of the drive clutch plates.

What is essential to the first embodiment is that the lengths of the arcs of the first peripheral portions 45, the second peripheral portion 46 and the third peripheral portion 47 of the passive clutch plate 32 differ from one another but correspond to the length of the arcs of the first cylindrical portion 29, the second cylindrical portion 34 and the third cylindrical portion 35 of the inner drum 39, respectively. Modifications may be made, so long as the condition is satisfied. For example, a plurality of spline portions 36 may be formed between the second cylindrical portion 34 and the third cylindrical portion 35.

Incidentally, in the first embodiment, instead of the cylindrical portions of the inner drum 39 and the peripheral portions of the passive clutch plate 32, the adjacent spline portions 36 may have different arc length, which can also prevent inverse assembly.

Next, the second embodiment according to the present invention will be described with reference to FIGS. 5 and 6, which are, for simplicity of illustration, partial views of the clutch drum and the clutch plate, respectively.

Figure 5:
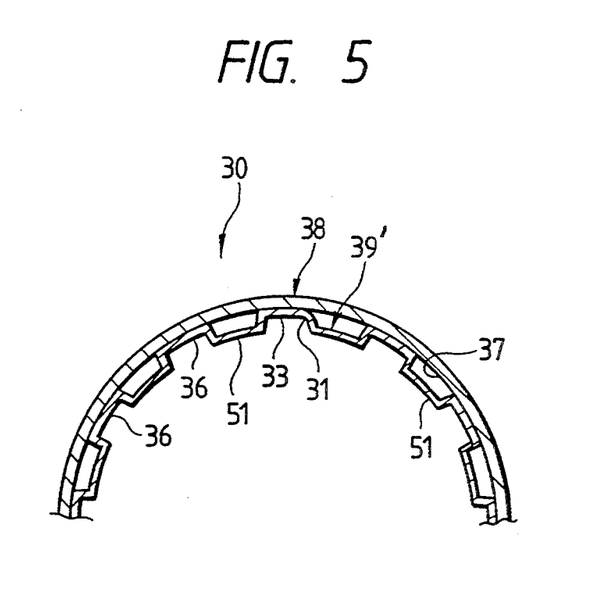
FIG. 5 shows part of the cross section showing the structure of the clutch drum of the second embodiment according to the present invention.

As shown in FIG. 5, the spline portions 36 of the inner drum 39' and cylindrical portions 51 are alternately arranged on the periphery of the inner drum 39' at regular intervals. However, one of the spline portions 36 is replaced by a modified spline portion 33 which has substantially the same length of arc and substantially the same thickness in the radial direction as the spline portions 36 but has one of its outer edges rounded at a portion 31. This portion 31 axially orients the passive clutch plate 32 which engages with the spline portions 36.

Figure 6:
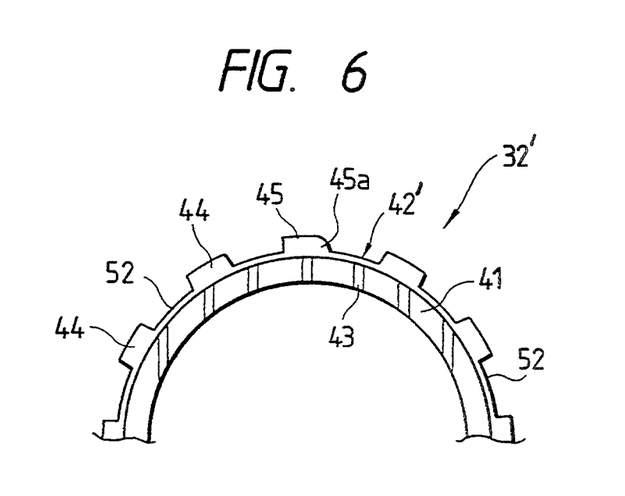
FIG. 6 is a front view showing part of the passive clutch plate of the second embodiment according to the present invention.

FIG. 6 is a front view of the passive clutch plate 32' to be put in the inner drum 39' shown in FIG. 5. The passive clutch plate 32' consists of a metal plate 42' of steel, aluminum, or the like, made by press working and wet-type frictional material 41 attached only on one side (the front side, in FIG. 6) of the metal plate. On the surface on which the frictional material 41 is attached, lubricating oil grooves 43 are provided so that lubricating oil leaking from the frictional material 41 flows into them when the clutch plates are pressed and slidingly engaged against each other.

A plurality of teeth 44 projected outward in the radial directions are formed on the outer periphery of the clutch plate 32' at regular intervals. The number of the teeth 44 is the same as the number of the spline portions 36 of the inner drum 39'. The teeth 44 have a shape corresponding to the inner surface of the spline portions 36 of the inner drum 39' shown in FIG. 5 so as to engage with the spline portions 36 when the passive clutch plate 32' is inserted from the axis direction. Peripheral portions 52 and the teeth 44 are alternately formed on the periphery of the clutch plate 32'. The teeth 44 have arcs of the same length. Also, the peripheral portions 52 also have arcs of the same length.

In the form shown, one of the teeth 44 is replaced by a modified tooth 45. This modified tooth 45 has substantially the same length of the arc and substantially the same thickness in the radial direction as the teeth 44, but has one of its outer edges rounded at a portion 45a. This portion 45a has a shape corresponding to the modified spline portion 33. Thus, the passive plate 32' is directed (oriented) by engaging the modified tooth 45 with the modified spline portion 33.

According to the construction of the second embodiment described above, the spline portion 33 having the portion 31 and the tooth 45 having the portion 45a serve as indicators to prevent the passive clutch plate 32' from being inversely mounted to the inner drum 39'. If inverted, the passive clutch plate 32 cannot be fit to the inner drum 39', so it has to be turned and properly mounted to the inner drum 39'.

Figure 7:
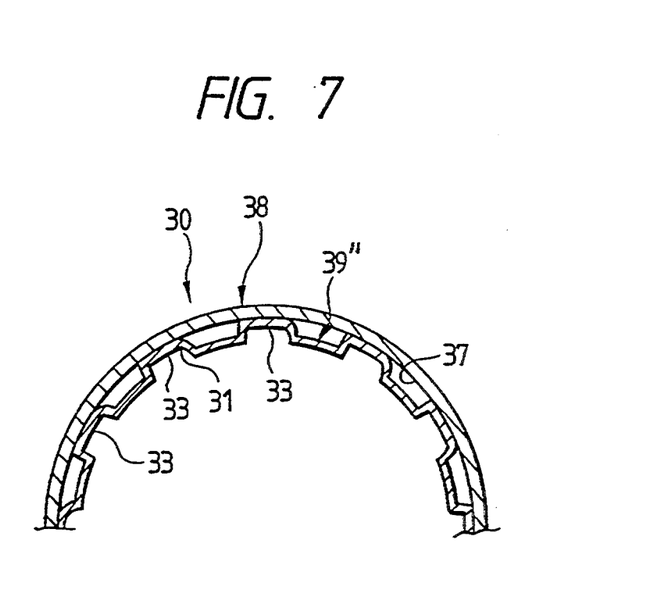
FIG. 7 is a cross-sectional view showing part of the structure of the clutch drum of the third embodiment according to the present invention.
Figure 8:
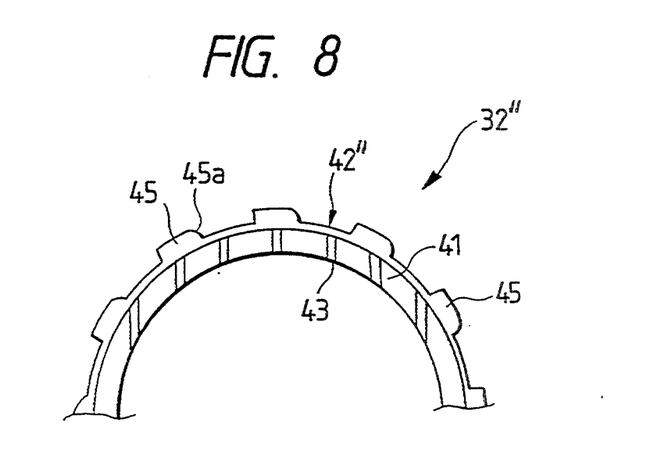
FIG. 8 is a front view showing part of the passive clutch plate of the third embodiment according to the present invention.

Next, the third embodiment according to the present invention will be described with reference to FIGS. 7 and 8. The third embodiment differs from the above-mentioned second embodiment in that all the spline portions of the inner drum 39" are replaced by the modified spline portions 33 having the rounded portions 31 and that all the teeth of the passive clutch plate 32" are replaced by the modified teeth 45 having rounded portions 45a. As a result, prevention of inverse assembly in the third embodiment can be ensured better than in the second embodiment.

Though, in the second and third embodiments, the modified tooth 45 has the rounded portion, it may have one of its outer edges cut off to have a bevel edge instead of the rounded R portion in order to direct the clutch plate to be put in the inner drum. In this case, the cross section of the modified tooth is a trapezoid or triangular. In either case, the modified edge portion of the modified tooth 45 must correspond to the modified spline portion 33. And, in case all the teeth are the modified ones, all the modified teeth must have respective modified edge portions on the same side.

Figure 9:
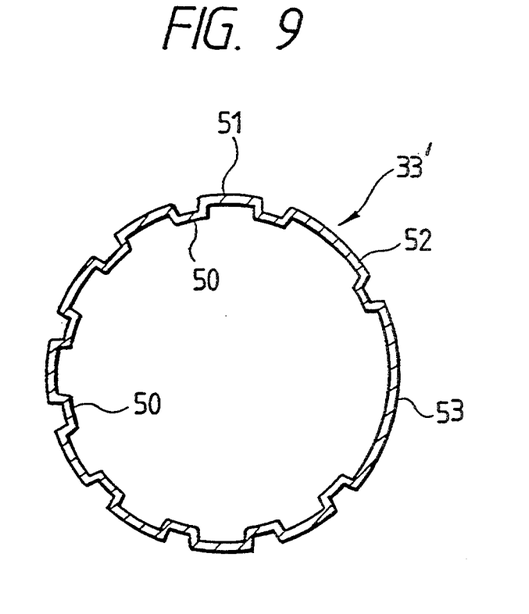
FIG. 9 is a cross-sectional view showing the structure of the clutch hub of the fourth embodiment according to the present invention.
Figure 10:
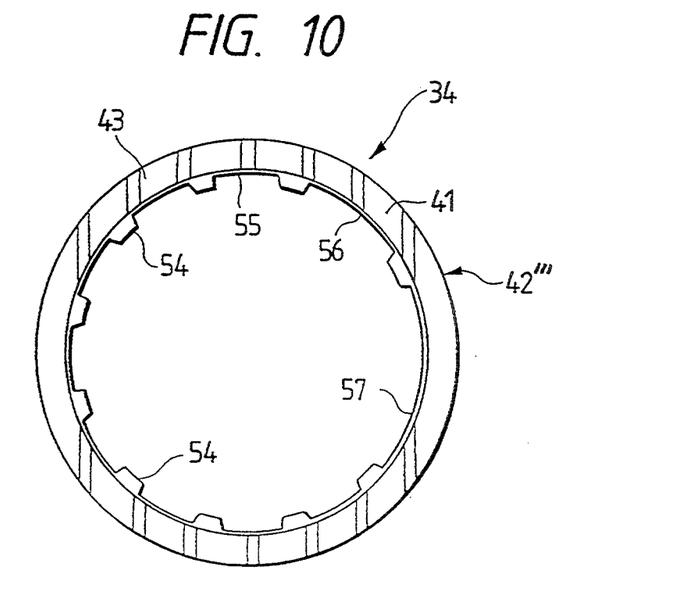
FIG. 10 is a front view of the drive clutch plate of the fourth embodiment according to the present invention.

FIGS. 9 and 10 respectively show a clutch hub 33' and a drive clutch plate 34 of the fourth embodiment according to the present invention. FIG. 9 shows a cross section, perpendicular to the axis direction, of the clutch hub 33' fixed to a clutch drum (not shown). The clutch hub 33' consists of a plurality of spline portions 50 projected inward in radial directions and elongated in the axial direction, first cylindrical portions 51, a second cylindrical portion 52 and a third cylindrical portion 53. These cylindrical portions 51, 52 and 53 join the spline portions 50. The rectangular cross sections of the spline portions 50 are of the same shape and the same size. The arcs of the plurality of the first cylindrical portions 51 are also of the same width.

There is provided only one second cylindrical portion 52. Also, only one third cylindrical portion 53 is provided to be adjacent to the second cylindrical portion 52 with one of the spline portions 50 therebetween. The lengths of the arcs of the first cylindrical portion 51, the second cylindrical portion 52 and the third cylindrical portion 53 are different from one another. In this embodiment, the third cylindrical portion 53 is the widest. As a result, the cross section of the clutch hub 33' is not symmetrical with respect to any diameter.

FIG. 10 is a front view of a drive clutch plate 34 to engage with the clutch hub 33' shown in FIG. 9. The annular drive clutch plate 34 consists of a metal plate 42" of steel, aluminum, or the like made by press working and wet-type frictional material 41 attached only on one side (the front surface, in FIG. 10) of the metal plate. On the surface on which the frictional material is attached, lubricating oil grooves 43 are provided so that lubricating oil leaking from the frictional material 41 flows in them when the clutch plates are pressed and slidingly engaged against each other.

A plurality of teeth 54 projected inward in the radial directions are formed on the inner periphery of the drive clutch plate 34. The number of the teeth 54 is the same as the number of the spline portions 50 of the clutch hub 33'. The teeth 54 have a shape corresponding to the inner surfaces of the spline portions 50 of the clutch hub 33' so as to engage with the spline portions 50 of the clutch hub 33' shown in FIG. 9 from the axis direction. On the inner periphery of the drive clutch plate 34, and among the teeth 54, there are formed a plurality of first peripheral portions 55, a second peripheral portion 56 and a third peripheral portion 57. The lengths of the arcs of the first peripheral portions 55, the second peripheral portion 56 and the third peripheral portion 57 correspond to those of the first cylindrical portions 51, the second cylindrical portion 52 and the third cylindrical portion 53 of the clutch hub 33' shown in FIG. 9.

Accordingly, when the drive clutch plate 34 is inserted into the clutch hub 33' shown in FIG. 9, it cannot be inserted inversely (that is, from the surface on which the frictional material 41 is attached first). Thus, neither the surfaces on which the frictional material is attached nor the metal surfaces can be faced with and frictionally slide against each other.

Figure 11:
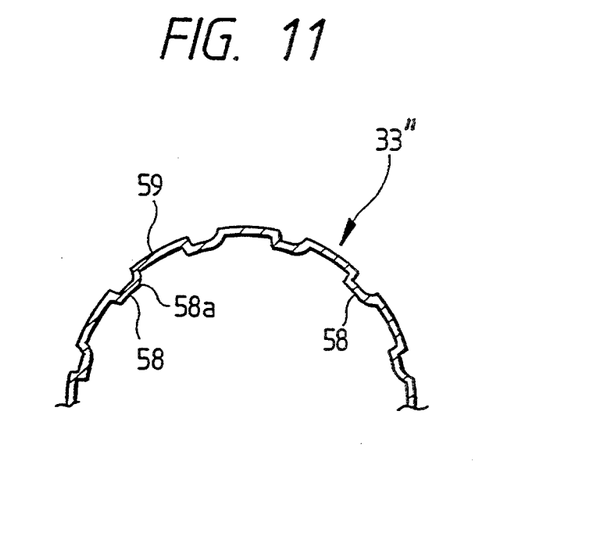
FIG. 11 is a cross-sectional view showing part of the structure of the clutch hub of the fifth embodiment according to the present invention.
Figure 12:
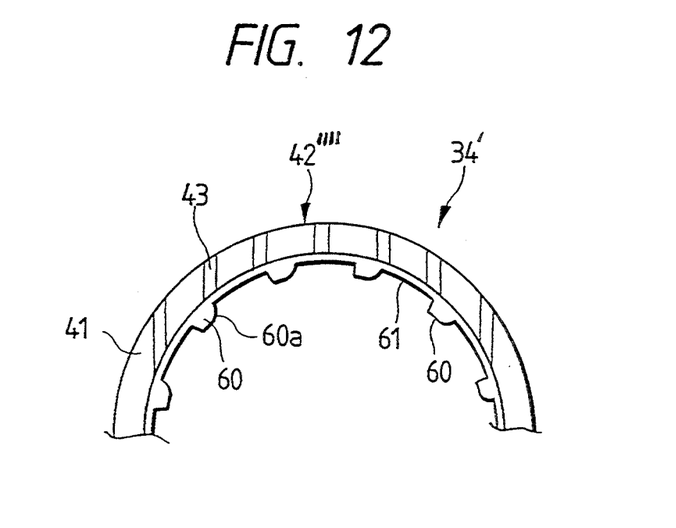
FIG. 12 is a front view showing part of the drive clutch plate of the fifth embodiment according to the present invention.

FIGS. 11 and 12 respectively show the clutch hub 33" and the drive clutch plate 34' of the fifth embodiment according to the present invention. FIG. 11 shows a cross section, perpendicular to the axis direction of the clutch hub 33" fixed to a clutch drum (not shown), wherein only half of the cross section is shown for simplicity of illustration. The clutch hub 33" consists of a plurality of spline portions 58 projected inward in radial directions and elongated in the axial direction and cylindrical portions 59. The spline portions 58 are arranged at regular intervals on the periphery of the clutch hub 33 and are of the same shape and of the same size. The cross section of each spline portion 58 is substantially rectangular and has a modified portion. The plurality of cylindrical portions 59 are of the same arc length.

The cross section of each spline portion 58 has one of its inner edges rounded at a portion 58a. The portions 58a are formed on the same side of respective spline portions 58. Accordingly, the cross section of the clutch hub 33" is not symmetrical with respect to any diameter.

FIG. 12 is a front view of the drive clutch plate 34' to engage with the clutch hub 33" shown in FIG. 10. The annular drive clutch plate 34' consists of the metal plate 42"" of steel, aluminum, or the like made by press working and the wet-type frictional material 41 attached only on one side (the front face, in FIG. 12) of the metal plate. On the surface on which the frictional material 41 is attached, lubricating oil grooves 43 are provided so that lubricating oil leaking from the frictional material 41 flows into them when the clutch plates are pressed and frictionally slide against each other. Incidentally, FIG. 12 also shows only half of the drive clutch plate 34' for simplicity of illustration.

A plurality of teeth 60 projected inward in radial directions are formed at regular intervals on the inner periphery of the drive clutch plate 34'. The number of the teeth 60 is the same as the number of the spline portions 58 of the clutch hub 33". The teeth 60 have a shape corresponding to that of the spline portions 58 of the clutch hub 33" shown in FIG. 11 so as to engage with the spline portions 58 from the axial direction.

Accordingly, when the drive clutch plate 34 is mounted to the clutch hub 33" shown in FIG. 11, it cannot be inserted inversely (that is, from the surface on which the frictional material 41 is attached first). Thus, neither the surfaces on which the frictional material is attached nor the metal surfaces can be faced with and frictionally slide against each other.

Incidentally, also in the fifth embodiment as well as in the second embodiment, only one tooth may have the rounded portion 60a of the tooth 60, while the other teeth have the normal, substantially rectangular shape. Also, though the modified spline portions 60 have the rounded portions 60a like in the second and third embodiments, they may have one of their inner edges cut off to be bevel edges. In this case, the overall cross section of each spline portion a trapezoid or triangular. In either case, all the spline portions must have respective modified edge portions on the same side.

Next, a method of facilitating transmission of frictional heat which can be applied to each of the above-mentioned embodiments will be described with reference to FIGS. 13 and 14. According to this method, transmission of frictional heat to the clutch drum or the clutch hub can be facilitated by thickening the teeth of the passive clutch plates and the drive clutch plates and increasing the tooth flank pressure.

Figure 13:
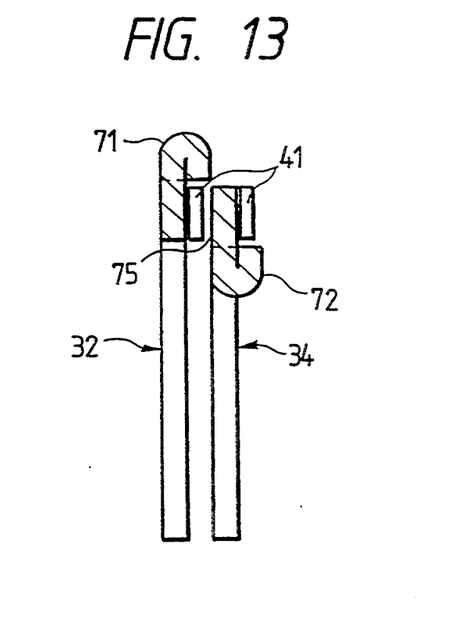
FIG. 13 is a cross-sectional view showing part of the passive clutch plate and the drive clutch plate according to a modification which can be applied to each of the embodiments according to the present invention, wherein the teeth of these clutch plates are thickened.

A tooth 71 of the passive clutch plate 32 shown in FIG. 13 has its free end folded by, for example, press working so that the edge comes to the same surface as the frictional material 41. Also, the drive clutch plate 34 to engage with the passive clutch plate 32 has its tooth 72 folded so as to the edge comes to the surface on which the frictional material 41 is attached. Thus, the metal surface of the passive clutch plate 32 remains flat and the surface of the clutch plate 32 on which the frictional material 41 is attached still sufficiently comes in contact with and frictionally slides against the metal surface 75 of the drive clutch plate 34. At the same time frictional heat can be easily transmitted from the tooth 71 to the inner drum as well as from the tooth 72 to the clutch hub. As press working is employed, the costs can be held down. Also, the lubricating oil grooves 43 can be formed by cutting or fabrication on the frictional material 41 without any extra machine shop tool or work tool. Further, as the folded edges are on the frictional sides, the frictional sides can be easily recognized when the clutch plates are inserted.

Figure 14:
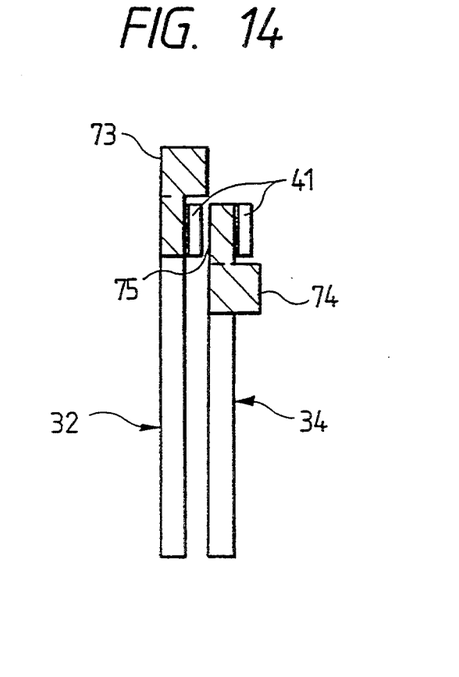
FIG. 14 is a cross-sectional view showing part of the passive clutch plate and the drive clutch plate according a modification which is different from that shown in FIG. 13 and can be applied to each of the embodiments according to the present invention, wherein the teeth of these clutch plates are thickened.

FIG. 14 shows another modification with thickened teeth, wherein the folded portions (thickened portions) in the previous embodiment shown in FIG. 13 formed by press working are replaced by a tooth 73 of the passive clutch plate 32 and a tooth 74 of the drive clutch plate 34, both of which are prepared by cutting or forging. The other parts are the same as those in FIG. 13. The thus prepared teeth can have larger heat capacity, that is, can more effectively radiate frictional heat.

The modifications shown in FIGS. 13 and 14 are preferable especially when the teeth are not formed uniformly over the periphery of each clutch plate, but asymmetrically as in the embodiments shown in FIGS. 3, 4, 9 and 10. Also, when the number of the teeth is small, the tooth flank pressure easily increases when the apparatus is applied to a car of large torque capacity. The thickened teeth shown in FIGS. 13 and 14 can substantially reduce the tooth flank pressure, and no problem about strength arises.

Figure 15:
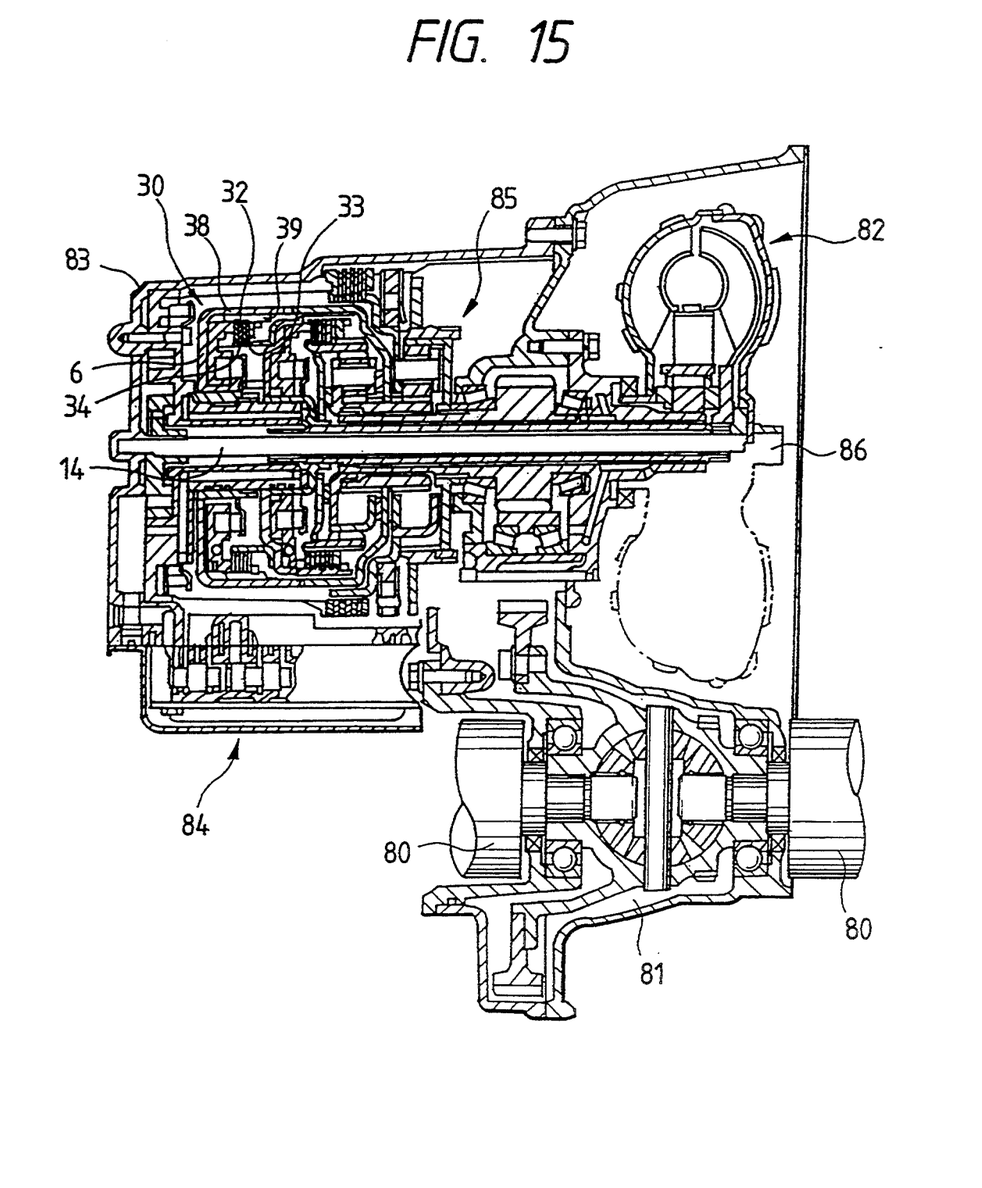
FIG. 15 is a cross-sectional view of an automatic transmission of a front wheel drive car to which the frictional engagement apparatus according to the present invention is applied.

FIG. 15 is a cross-sectional view of an automatic transmission for a front wheel drive car (FF car) to which a frictional engagement apparatus according to the present invention is applied. The power from an engine is transmitted through a torque converter 82 and an input shaft 86 to respective gears of the transmission. The clutch drum 30 is located inside a transmission case 83. The gears are properly selected by means of an epicyclic gear mechanism 85, wherein connection and disconnection of a drive unit is performed by the wet-type multi-plate frictional engagement apparatus, that is, the wet-type multi-plate clutch. A control valve mechanism 84 is attached to the bottom of the transmission case 83. The power from the transmission is transmitted through a differential gear mechanism 81 and an output shaft 80 to wheels.

Incidentally, in each of the above-mentioned embodiments, the numbers of the spline portions and the teeth as well as the intervals therebetween can be determined to be optimal in consideration of the transmitted torque.

The following effects can be obtained from the above-mentioned frictional engagement apparatus according to the present invention.

As the spline portions of the inner drum or the clutch hub are asymmetrically provided with respect to any diameter of the cross section perpendicular to the axis direction, and/or as the teeth to engage with the splines have the means for directing the passive clutch plates, or the drive clutch plates the clutch plates can not be inversely inserted in the clutch drum or the clutch hub with respect to the frictional surface and the metal surfaces.

Also, when the teeth of the passive clutch plates and the drive clutch plates are, at least partially, thickened, the abrasion loss of the drive clutch plates and that of the passive clutch plates can be uniformed, and the frictional heat of these clutch plates can effectively escape to the inner drum and the clutch hub. At the same time variation in durability can be reduced.

What is claimed is:

1. A wet-type multi-plate frictional engagement apparatus, comprising:
   a plurality of drive clutch plates and a plurality of passive clutch plates, said drive clutch and passive clutch plates being metal plates having wet-type frictional material attached only on one side and arranged alternately so as to be engageable with each other, and
   a clutch drum having substantially cylindrical outer and inner drums,
   wherein splines are formed on a peripheral surface of said inner drum and elongated in an axial direction of said inner drum, said splines are disposed in an asymmetric arrangement circumferentially of said inner drum, and radially outwardly projecting teeth are formed on outer peripheries of said passive clutch plates and uniquely axially orient said passive clutch plates by engagement with said splines.

2. A frictional engagement apparatus according to claim 1, wherein the teeth of said passive clutch plates are thickened in an axial direction of said passive clutch plates relative to non-projecting portions of said passive clutch plates.

3. A wet-type multi-plate frictional engagement apparatus, comprising:
   a plurality of drive clutch plates and a plurality of passive clutch plates, said drive clutch and passive clutch plates being metal plates having wet-type frictional material attached only on one side and arranged alternately so as to be engageable with each other, and
   a clutch drum having substantially cylindrical outer and inner drums,
   wherein splines are formed on a peripheral surface of said inner drum and elongated in an axial direction of said inner drum, radially outwardly projecting teeth are formed on outer peripheries of said passive clutch plates, and said splines and said teeth include cooperable means for uniquely orienting said passive clutch plates in an axial direction.

4. A frictional engagement apparatus according to claim 3, wherein the teeth of said passive clutch plates are thickened in an axial direction of said passive clutch plates relative to non-projecting portions of said passive clutch plates.

5. A wet-type multi-plate frictional engagement apparatus, comprising:

a plurality of drive clutch plates and a plurality of passive clutch plates, said drive clutch and passive clutch plates being metal plates having wet-type frictional material attached only on one side and arranged alternately so as to be engageable with each other, and a substantially cylindrical clutch hub supporting said drive clutch plates, wherein splines are formed on a peripheral surface of said clutch hub and elongated in an axial direction of said clutch hub, said splines are disposed in an asymmetric arrangement circumferentially of said clutch hub, and radially inwardly projecting teeth are formed on inner peripheries of said drive clutch plates and uniquely axially orient said drive clutch plates by engagement with said splines.

6. A frictional engagement apparatus according to claim 5, wherein the teeth of said drive clutch plates are thickened in an axial direction of said drive clutch plates relative to non-projecting portions of said drive clutch plates.

7. A wet-type multi-plate frictional engagement apparatus, comprising:

a plurality of drive clutch plates and a plurality of passive clutch plates, said drive clutch and passive clutch plates being metal plates having wet-type frictional material attached only on one side and arranged alternately so as to be engageable with each other, and a substantially cylindrical clutch hub supporting said drive clutch plates, wherein splines are formed on a peripheral surface of said clutch hub and elongated in an axial direction of said clutch hub, radially inwardly projecting teeth are formed on inner peripheries of said drive clutch plates, and said splines and said teeth include cooperable means for uniquely orienting said drive clutch plates in an axial direction.

8. A frictional engagement apparatus according to claim 7, wherein the teeth of said drive clutch plates are thickened in an axial direction of said drive clutch plates relative to non-projecting portions of said drive clutch plates.

* * * * *